March 6, 1934.  A. E. WILSON  1,949,523

AUTOMOBILE GASOLINE TANK LOCK

Filed Nov. 21, 1932

*INVENTOR,*
Axel E. Wilson.

BY David E. Lain,
ATTORNEY.

Patented Mar. 6, 1934

1,949,523

UNITED STATES PATENT OFFICE 1,949,523

AUTOMOBILE GASOLINE TANK LOCK

Axel E. Wilson, Bellingham, Wash.

Application November 21, 1932, Serial No. 643,601

2 Claims. (Cl. 220—55)

My invention relates to improvements in automobile gasoline tank locks, and has for an object to provide a closure for the filling opening of the gas tank of an automobile which is mechanically operable by a handle attached to the instrument board of the machine within easy reach of the driver thereof whereby the said closing member may be moved to cover and uncover the said opening and be locked in a covering position at the instrument board against being uncovered at the tank.

Other objects of my improvement will appear as the description proceeds.

Figure 1:
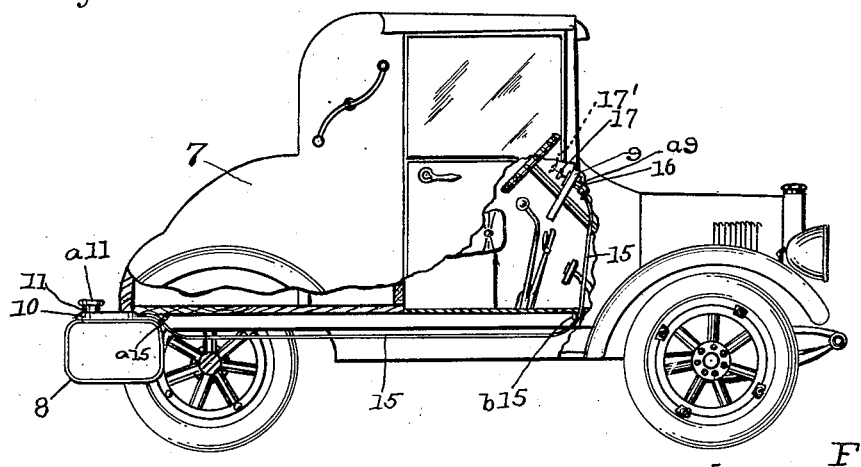
Figure 2:
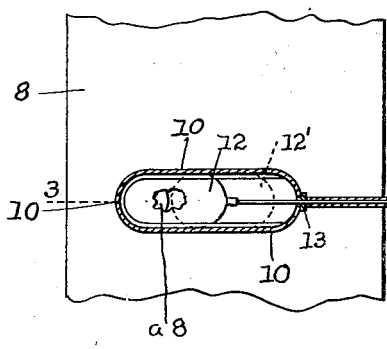
Figure 4:
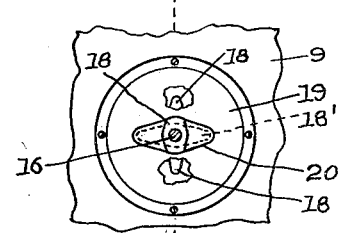
Figure 6:
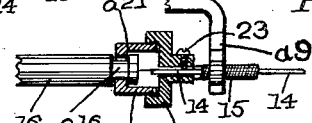
Figure 3:
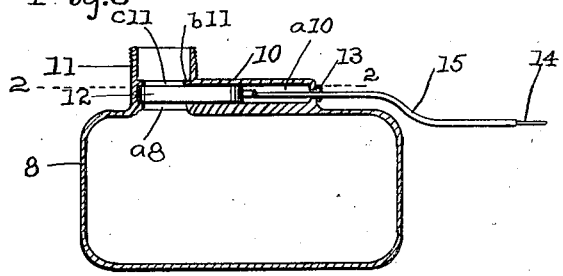
Figure 5:
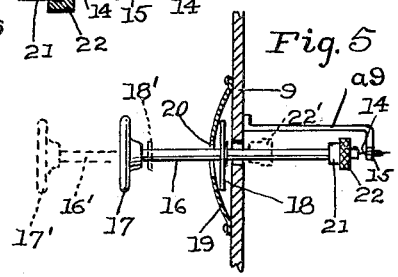

I attain these and other objects of my improvement with the mechanism illustrated in the accompanying sheet of drawing, which forms a part of this specification, in which Figure 1 is a side elevation of an automobile parts of which are broken away to show my device in place thereon, Fig. 2 is a plan view of a fragmentary part of the gasoline tank of the automobile on which the gate of my tank lock is installed shown in section on the line 2—2 of Fig. 3 drawn on a larger scale, Fig. 3 is an end elevation of Fig. 2 in section on the line 3—3 of Fig. 2, Fig. 4 is a front elevation of a fragmentary portion of the instrument board of the automobile on which the operative control and locking portions of my device are installed drawn on a larger scale, Fig. 5 is a side elevation of Fig. 4 in section on the line 5—5 thereof, and Fig. 6 is an enlarged view of a portion of Fig. 5.

Similar characters refer to similar parts throughout the several views. Certain parts are broken away to show other parts hidden thereby.

With more particular reference to the designated parts: At the rear end of the automobile 7 is the gasoline tank 8 fastened to the frame of the machine in a manner common in the art with the filling tube 11 and the screw cap all thereon conveniently disposed for putting gasoline in the tank. Opening 8a through the top wall of the tank registers with the tube 11.

The guide housing 10 is fastened on top of the tank 8 and to the front wall of the tube 11 providing the chamber 10a which is tributary to the interior of the tube 11 and the tank opening 8a through an opening in the front wall of the tube. An annular interior boss 11b of the tube 11 is in the plane of the top wall of the housing 10 and provides the opening 11c aligned with the tank opening 8a.

The gate 12 is mounted for reciprocation in the chamber 10a, in the guides provided by the guide housing 10, to open and close communication through the aligned openings 11c and 8a between the tube 11 and the tank 8 by the reciprocation thereof in the said housing 10. When the gate 12 is in its position shown in solid lines the said openings are closed thereby, and when the gate is in the position thereof shown in dotted lines at 12′ it has been withdrawn to uncover the said openings and establish communication between the tube and the tank.

In a central opening in the front wall of the housing 10 is fastened the bushing 13 and to this bushing is fastened one end of the piano wire sheath 15. The sheath 15 is extended from the bushing 13 beneath the floor of the car and is bent upward at the rear of the engine terminating adjacent the instrument board 9. During the course of the sheath it is fastened to the car frame at several places to localize it. Two of these fastenings are shown at 15a and 15b in Fig. 1, and the bracket 9a is fastened to the instrument board and to it is fastened the other end of the sheath.

The manual control stem 16 has hand wheel 17 fastened on its inner end and is mounted in a bearing in the instrument board 9 for reciprocation. Midway on the stem 16 is fastened the double catch 18, a relatively long narrow body having a central hole through which the stem is extended and fastened therein.

The convex plate 19 is fastened on the inner side of the instrument board 9 concentric with the stem 16, providing a chamber between the plate and board, and has a long narrow central opening therein at 20 providing for the passage of the catch 18 therethrough into the said chamber. The catch when in the chamber may be engaged with the plate by turning the wheel 17 through an angle of 90° thus moving the catch from its dotted position at 18′ to its solid-line position as shown in Fig. 4.

In the outer end of the stem 16 is the annular groove 16a with which is engaged the two-part swivel member 21, 21a. The swivel member has external threads thereon and is engaged thereby in the interior threaded cap 22. The cap 22 has a central hub with a central hole therethrough in which is extended one end of the piano wire 14 and fastened therein by the set screw 23.

The construction provides for retaining the piano wire 14 longitudinally in its solid-line position by the engagement of the catch 18 with the plate 19, that is: longitudinally stationary with respect to the car. While by turning the hand wheel 17 through an angle of 90° the catch 18 becomes disengaged from the plate 19 and the stem 16 with the attachments thereon may be withdrawn to their dotted-line positions at 16′, 17', 18', 22', thus moving the wire 14 longitudinally the same distance as the stem and attachments thereon were moved.

The piano wire 14 is extended from its upper end, where, as described, it is indirectly fastened to the hand wheel 17, through the sheath 15, through the bushing 13 and has its lower end fastened to the forward end of the gate 12.

The construction provides for moving the gate 12 from its closed position shown in solid lines to its open position shown in dotted lines at 12' by pulling hand wheel 17 from its position shown in solid lines to its position shown in dotted lines at 17', and for moving the gate back to its closed position from its open position by pushing on the hand wheel to return it to its position shown in solid lines when the gate will have been returned to its closed position shown in solid lines. During the described opening and closing of the gate 12 by reciprocating the handle stem 16 the piano wire 14 serves both as a tension member and a compression member. Furthermore, the gate 12 may be locked in its said closed position by revolving the hand wheel 17, at a time when the catch is aligned with the disc opening 20 and being disposed in the chamber beneath the disc 19, through an angle of 90°. When thus locked, the tank 8 is closed against entry through the tube 11 by the gate 12 which can not be operated by means introduced in the said tube.

Having thus disclosed my invention, what I claim as new therein and desire to secure by Letters Patent is,—

1. A device substantially as described including, a gate housing and guide fastened on a tank having an opening therein the said housing having an opening therein registering with the said tank opening, a gate mounted for reciprocation in the said housing and guide between the said housing and tank openings to cover and uncover the said tank opening by the said reciprocations, a stationary sheath extended from the said housing, a wire tension and compression member having one end thereof fastened to the said gate being extended through the said sheath with its other end protruding therefrom, and a handhold member fastened to the said other end of the said wire to manually reciprocate the said wire and the said gate.

2. A device substantially as described including, a combined gate housing and tank tube fastened to a tank having an opening therein registering with the said tube, a gate mounted for reciprocation in the said housing between the said tube and tank opening for covering and uncovering the said tank opening by the said reciprocation thereof, a stationary sheath extended from the said housing, a tension and compression wire one end thereof being fastened to the said gate being extended through the said sheath protruding beyond the extended end thereof, a hand-hold member mounted for reciprocation and oscillation swivelingly engaged with the other end of the said wire for manually reciprocating the same, and holding means engageable with the said hand-hold member by oscillation thereof to restrain reciprocation thereof.

AXEL E. WILSON.